United States Patent [19]

Quaeler-Bock et al.

[11] Patent Number: 6,023,271
[45] Date of Patent: Feb. 8, 2000

[54] FRAMEWORK FOR BINDING DATA VIEWERS/DATA MANIPULATION WITH ONE TO MANY OBJECTS THROUGH INTROSPECTION

[75] Inventors: Loki Der Quaeler-Bock; Raymond J. Ryan; Keith Bernstein, all of San Francisco, Calif.

[73] Assignee: Sun Microsystems, Inc., Palo Alto, Calif.

[21] Appl. No.: 09/097,108

[22] Filed: Jun. 11, 1998

[51] Int. Cl.[7] ...................................................... G06F 3/14
[52] U.S. Cl. ........................ 345/335; 345/333; 345/339; 709/300; 709/303
[58] Field of Search .................................... 345/333, 334, 345/335, 339; 709/300, 301, 302, 303, 304, 305

[56] References Cited

U.S. PATENT DOCUMENTS

| | | | |
|---|---|---|---|
| 5,721,848 | 2/1998 | Joseph ...................................... | 345/339 |
| 5,761,656 | 6/1998 | Ben-Shachar ........................ | 345/335 X |
| 5,768,158 | 6/1998 | Alder et al. ........................... | 345/333 X |
| 5,872,973 | 2/1999 | Mitchell et al. ........................ | 709/303 |

OTHER PUBLICATIONS

Kieth Short, Developing w/Business objects, Object Magazine, Mar.—Apr. 1995, pp. 66–72

J. Adamczyk et al., Trading Off: Inheritance vs Reuse, Object Magzaine, Sep. 1995, pp. 56–59.

Ted Shelton, A primer on Business Objects, Object Magazine, Jun. 1995, pp. 20–22.

*Primary Examiner*—Raymond J. Bayerl
*Assistant Examiner*—C. A. Jackson
*Attorney, Agent, or Firm*—Pennie & Edmonds LLP

[57] ABSTRACT

Systems and methods for programming applications with GUIs in accordance that do not require time-consuming and error-prone custom coding of GUI/internal variable synchronization routines, in general, and GUI/BO synchronization routines, in particular. An embodiment includes a plurality of classes for associating and synchronizing GUI components and BO attributes. The classes include: an inspector class, a selection class and a plurality of editor classes. The inspector class includes methods and data structures that enable a client application to bind a set of GUI components to the attributes of at least one business object. As a first step in associating and synchronizing GUI components and BO attributes a client application constructs an instance of the inspector class. The client application then passes the inspector instance a selection class instance that includes the business object(s) whose properties are to be synchronized with the GUI components. The client application also passes the inspector instance a mapping between BO attributes and GUI components. The present invention can be implemented in the Java™ programming language or any other object-oriented language. When the BOs are implemented as JavaBeans™ Objects, their properties are discovered using the JavaBeans™ property of introspection.

6 Claims, 11 Drawing Sheets

Supporter Classes 156

| | |
|---|---|
| GUI Component Supporters | 170 |
|     JComboBox Supporter | 172 |
|     JLabel Supporter | 174 |
|     JList Supporter | 176 |
|     JTextField Supporter | 178 |
|     JTextComponent Supporter | 180 |
|     JToggleButton Supporter | 182 |
|     JButtonGroup Supporter | 184 |
|     JTable Supporter | 186 |

| | |
|---|---|
| FIInspector Interface | 140 |
|     setSelection | 140.1 |
|     addPropertySupport | 140.3 |
|     addEditor | 140.4 |
|     queuePropertyChange | 140.5 |
|     firePropertyChange | 140.6 |
| FIEditor Interfaces | 142 |
|     addNotificationListener | 142.1 |
|     getProperty | 142.2 |
|     setEnabled | 142.3 |
|     setMultiValued | 142.4 |
|     setValue | 142.5 |
| FISelection Interfaces | 146 |
|     setElements | 146.1 |
|     setPropertiestoValues | 146.3 |
|     setPropertytoValue | 146.6 |

FIG. 1B

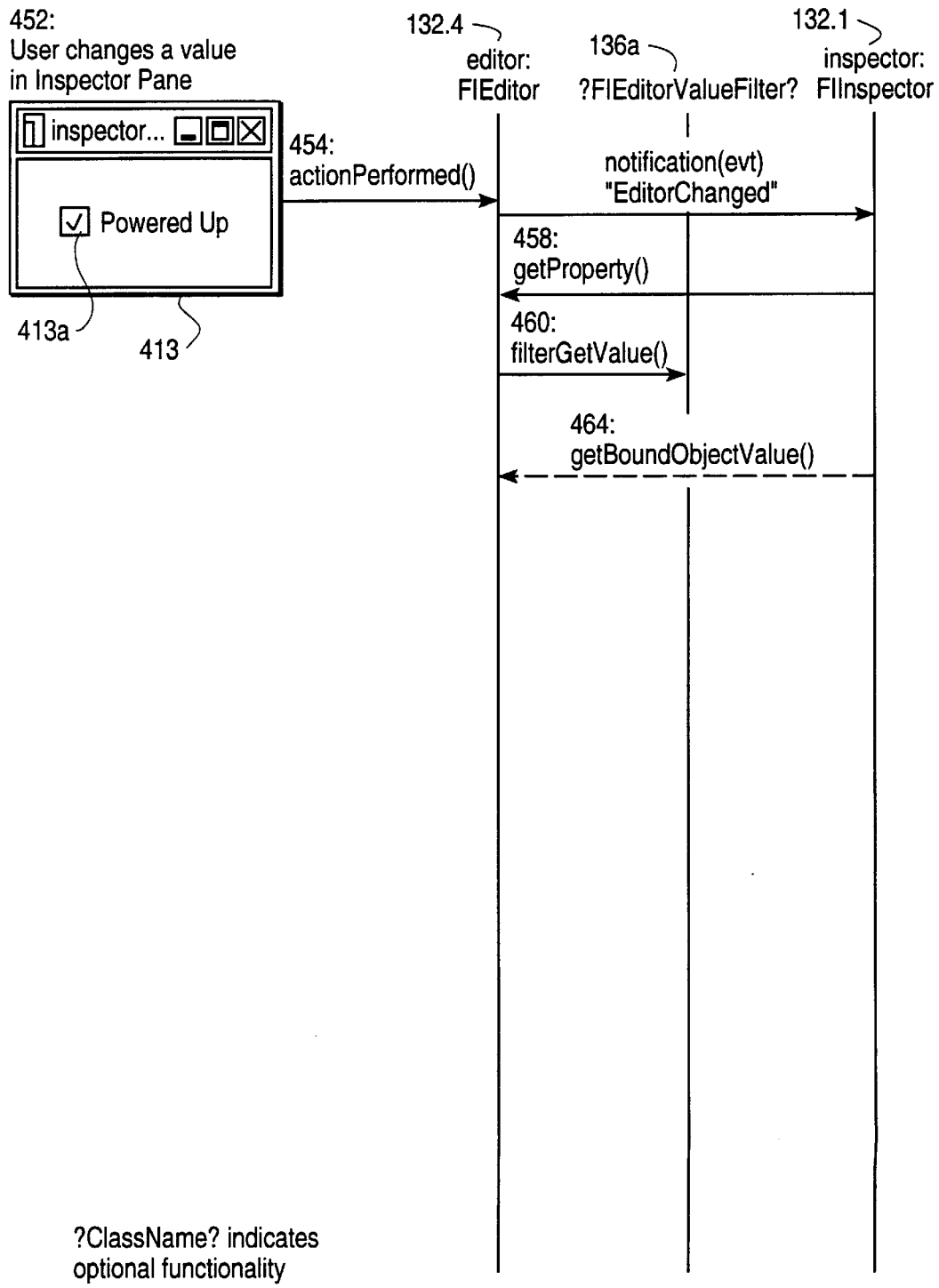

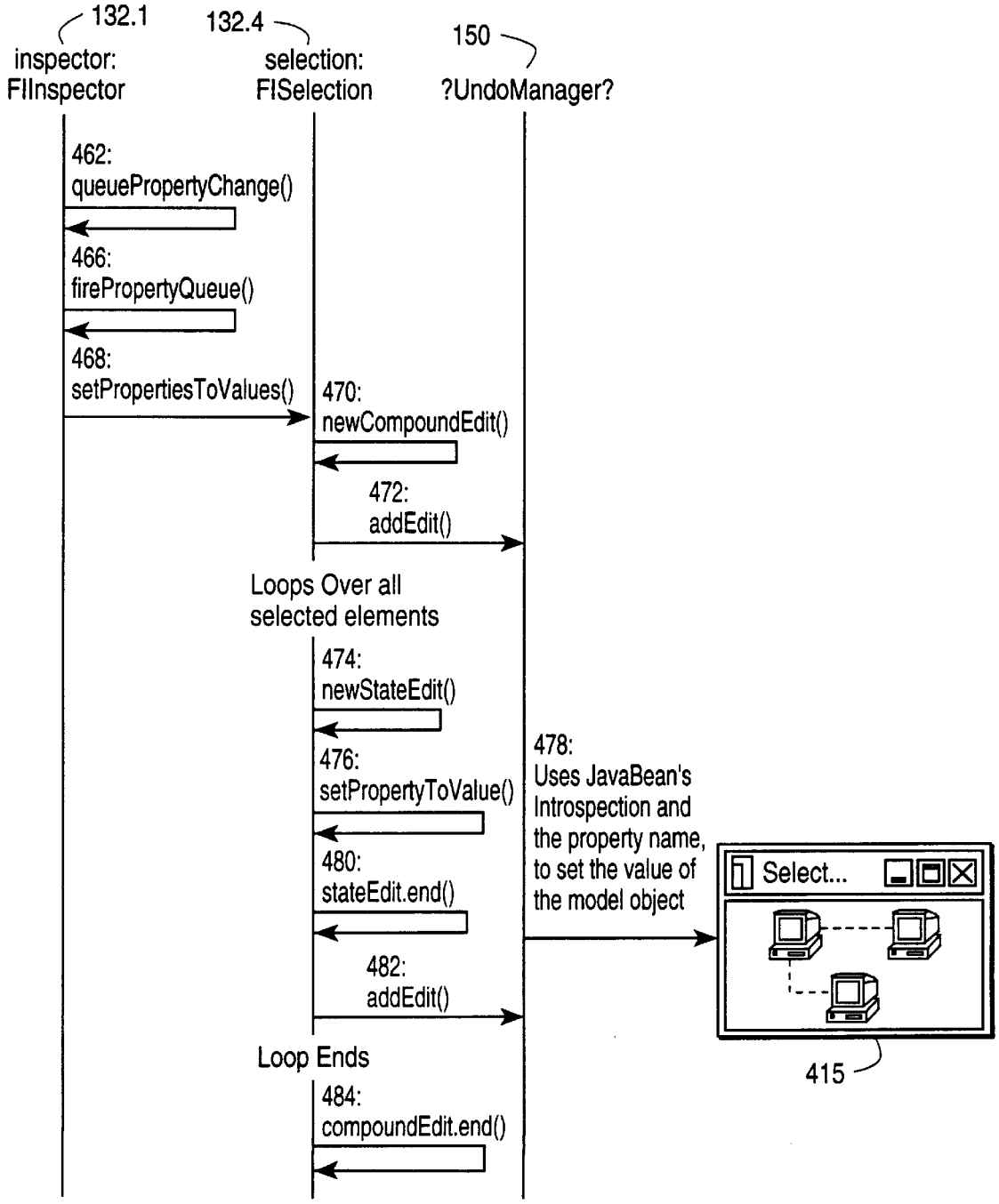

FIG. 8B →

FRAMEWORK FOR BINDING DATA VIEWERS/DATA MANIPULATION WITH ONE TO MANY OBJECTS THROUGH INTROSPECTION

The present invention relates generally to applications with graphical user interfaces and, particularly, to systems and methods for synchronizing the values of graphical user interface components and application variables.

A portion of the disclosure of this patent document contains materials to which a claim of copyright protection is made. The copyright owner has no objection to the facsimile reproduction by anyone of the patent document or the patent disclosure, but reserves all other rights whatsoever.

BACKGROUND OF THE INVENTION

Today, most end user applications employ a graphical user interface (GUI) that simplifies the manner in which a user interacts with an application. Typical graphical user interface components include:

icons that trigger features of the application when selected by a user;

text fields that can be filled in by a user;

radio buttons presenting a choice of options, only one of which can be selected by a user;

combo boxes presenting a list of options, one of which can be selected by a user, as well as a field that can be filled in by a user;

check boxes presenting a choice of options, many of which can be simultaneously selected by a user;

lists presenting a list of options, one of which can be selected by a user; and trees displaying hierarchical relationships of a set of objects.

In a typical GUI implementation, each GUI component generates GUI events to indicate changes in its value and/or the occurrence of user actions related to that GUI component. The type of GUI events generated depends on the type of the associated GUI component. For example, a text field component can generate focus events (when a user moves their mouse into the area on the screen corresponding to the text field) or action events (when a user hits the "enter" key or clicks a mouse button to enter a value into the field).

An application with a GUI is programmed so that any change in the value of a GUI component is reflected by a corresponding change in the value of an internal variable (or variables) mapped to that GUI component. In the prior art, the application code that accomplishes this mapping of GUI component values to internal variable values is crafted manually. For example, if an application includes a telNumber variable associated with a GUI telephone number text field, the application programmer would need to create a synchronization routine that:

1) detects GUI events associated with the GUI telephone number field;

2) accepts a new telephone number value entered in the GUI field;

3) converts it from the GUI representation (e.g., an array of ASCII values) to the internal representation (e.g., an integer); and 4) stores the resulting integer value in the telNumber variable.

The programmer would also need to write synchronization routines enabling any change in the value of an internal variable to be reflected in the value of the GUI component (or components) mapped to that internal variable. This need arises, e.g., when a search engine returns a result that needs to be displayed on a GUI screen.

Many object-oriented computer languages, such as the Java™ programming language (Java and all Java-based trademarks and logos are trademarks or registered trademarks of Sun Microsystems, Inc. in the United States and other countries), provide features that streamline some aspects of defining the interfaces between application and GUI code. For example, Java™ and other object-oriented languages support the use of business objects (BO), where a business object is an object used to transfer data between a client application (such as a database program) and a GUI screen for displaying/modifying the client data; typically the business objects are created by the client application. Typically, each business object includes a set of attributes associated with one type of entity. For example, in an electronic commerce application, business objects might exist for customer information (with attributes for last name, first name, address, phone number, etc.), order information (with attributes for item no., item color, quantity) and inventory information (with attributes for item no., item color, number available). These business objects conveniently package data for use by other objects; however, programmers using the Java™ programming language still need to write the routines that synchronize associated GUI component values and BO attribute values.

The Java™ programming language provides a class of objects, called listeners, that facilitates the coding of application GUIs. There are many different types of listeners, each of which is configured to detect a different type of GUI event. For example, in the case of a text field component, the application would need to employ focus and action listeners to detect focus and change events associated with that component. Moreover, each GUI component to be monitored by an application needs to have its own listener(s). For example, to interact with a customer GUI having two text field components (e.g., a customers last name and telephone number), an application would need respective pairs of focus and action listeners. Each event provides the name of the affected component, its old value and its new value.

Other types of listeners, called property change listeners, listen for change events generated by a BO whenever the values of one or more of its attributes change. Each change in a BO attribute leads to the generation of a respective change event that indicates the name and old and new values of the changed attribute. A BO can register several property change listeners. Whenever an attribute value changes, each of the listeners is notified with the change event and is responsible for identifying the changed attribute from the name included in the change event.

Applications configured to work with GUI and BO listeners receive notification of events detected by the listeners and synchronize the GUI components and BO attributes as appropriate. For example, an application that registered lastName and telNumber action listeners to a customer GUI would be notified whenever the GUI's last name and telephone number text field components were changed. The application could then call custom-coded synchronization routines to update corresponding lastName and telNumber attributes of a customer BO. In a similar vein, an application that registered property change listeners to lastName and telNumber attributes of the customer BO would receive notification of change events whenever the values of BO's last name and telephone number attributes were updated. The application would then call custom synchronization routines as a prelude to displaying the new values on the corresponding GUI components. Even with listeners, it is tedious to produce the application code needed for synchronization and the resulting code is likely to include errors.

Therefore, there is a need for a system and method for programming applications with GUIs that does not require the time-consuming and error-prone custom coding of GUI/internal variable synchronization routines, in general, and GUI/BO synchronization routines, in particular.

SUMMARY OF THE INVENTION

Systems and methods for programming applications with GUIs in accordance with the present invention do not require the time-consuming and error-prone custom coding of GUI/internal variable synchronization routines, in general, and GUI/BO synchronization routines, in particular.

An embodiment of the present invention includes a plurality of classes for associating and synchronizing GUI components and BO attributes. The classes include: an inspector class, a selection class and a plurality of editor classes. The inspector class includes methods and data structures that enable a client application to bind a set of GUI components to the attributes of at least one business object. As a first step in associating and synchronizing GUI components and BO attributes a client application constructs an instance of the inspector class. The client application then passes the inspector instance a selection class instance that includes the business object(s) whose properties are to be synchronized with the GUI components. The client application also passes the inspector instance a mapping between BO attributes and GUI components. It is not a requirement that all of the BOs in the selection have the same attributes. The present invention can be implemented in the Java™ programming language or any other object-oriented language.

Using this information on BO attributes and GUI components the inspector instance constructs a plurality of editor instances to interact with/edit respective GUI components. The inspector instance configures each editor to report to it all changes to its associated GUI component. Similarly, the selection instance is configured to report to the inspector all changes to the attributes of its associated business objects. In this way the inspector instance is able track all changes to its associated selection of business objects and GUI components and, using methods of the editors and selection instance, to update the BO attributes and GUI components accordingly.

In one embodiment each of the editors is configured to interact with a particular type of GUI component and, where appropriate, to register to components of that type an appropriate set of listeners. For example, in one embodiment there are specialized editor classes that work with text field, list, radio button and table components. Each component editor includes methods and data structures for interacting with its respective GUI component. Among other things the methods are used to write new values into a GUI component, to monitor events reported by listeners associated with the GUI component and to get values of the GUI component to be reported to the inspector instance.

In another embodiment of the present invention the selection class provides methods and data structures for interacting with business objects providing data that is to be shown on a GUI. These methods allow an application to define a vector of business objects to be processed by the inspector, report changes in the selected business objects, reports changes in the values of the BO attributes, and update the values of the BO attributes to reflect changes in the mapped GUI components.

Based on this infrastructure, the inspector framework synchronizes the attributes and the components in response to events reported by the selection and editor instances so that:

1) a change in the value of any of the attributes is reflected in a corresponding change in the value(s) of the component(s) mapped to that attribute, and 2) a change in the value of any of the components is reflected in a corresponding change in the value(s) of the attribute(s) mapped to that component.

In yet another embodiment of the present invention the business objects are JavaBeans™ objects, where a JavaBeans™ object includes variables whose values are written and read using methods with names predictably derived from the variable names. For example, all variables with name "vName" can be read with a method entitled "getVName" and can be written with a method entitled "setVName". In this embodiment, each of the BO attributes is associated with respective Get and Set methods. The selection instance leverages this naming scheme by generating Get and Set calls to read and write the BO attribute values as required.

BRIEF DESCRIPTION OF THE DRAWINGS

Additional objects and features of the invention will be more readily apparent from the following detailed description and appended claims when taken in conjunction with the drawings, in which:

FIG. 1B is a block diagram showing additional details of the data structures and methods employed by the inspector framework FIG. 1A;

FIG. 7 is an object transition diagram illustrating the order of events through which the inspector framework updates a selected BO in response to a change in value of a GUI component.

DESCRIPTION OF EMBODIMENTS

Figure 1A:
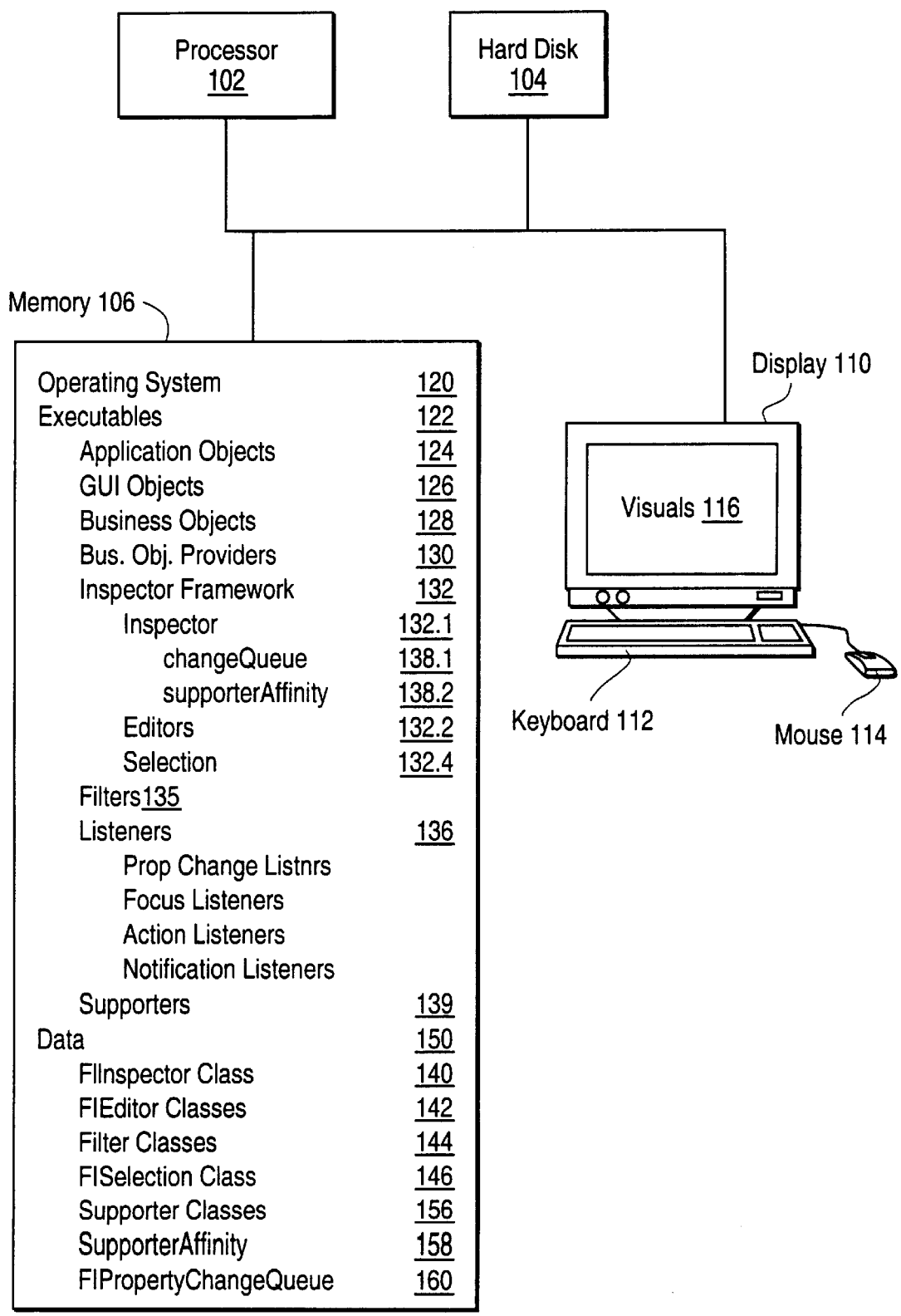
FIG. 1A is a block diagram of a computer in which an embodiment of the present invention is implemented.

Referring to FIG. 1A, there is shown a diagram of a computer system 100 in which the present invention can be implemented. The computer system 100 includes a processor 102; a slow, secondary memory, such as a hard disk 104; a fast, primary memory, such as a semiconductor random access memory (RAM) 106; a display 110; and user input devices, such as a keyboard 112 and mouse 114. Information is in part conveyed to a user as visuals 116 on the display 110.

The computer system 100 operates according to well-known principles. The hard disk 104 permanently stores an operating system 120, programs 122 and data 150 that are loaded into the primary memory 106 for use by the processor 102 as needed. The processor 102 executes the programs 122 under control of the operating system 120, which also provides the programs 122 with access to system resources, such as the hard disk 104, the display 110 and the user input devices 112, 114. The executables 122 include application objects 124, GUI objects 126, business objects (BO) 128, an inspector framework 132 and listeners 136. Data 150 used by the inspector framework 132 includes an FIInspector interface 140, FIEditor interfaces 142, Filter interfaces 144, an FISelection interface 146 and Supporter classes 156. An interface is a Java™ programming language construct that defines a list of methods. Any class that implements all of the interface's methods is said to be an implementation of that interface. A class can implement more than one interface. The present invention employs interfaces in this matter to provide flexibility; however, similar functionality can be provided with classes. For more background information on interfaces, refer to Patrick Niemeyer & Joshua Peck, "Exploring Java," (2nd ed. 1997), which is entirely incorporated herein by reference.

The application objects 124, GUI objects 126 and business objects (BO) 128 correspond respectively to application code; internal representations of the application GUIs; and business objects (BO) used to transfer information between GUI objects and application objects, as described in the background. The inspector framework 132, which embodies many of the present invention's teachings, links and synchronizes business objects 128 and GUI objects 126. The inspector framework 132 includes inspector objects 132.1, editor objects 132.2 and selection objects 132.4, which respectively implement the FIInspector interface 140, FIEditor interfaces 142 and FISelection interface 146. Filter objects 135 used by the inspector framework 132 implement the Filter interface 144. These objects are also referred to herein as implementations or instances.

The inspector interface 140 includes methods that can be invoked by application objects 124 to specify a mapping between the BO attributes and GUI components to be synchronized. In accordance with the defined mapping, other methods of the inspector interface 140 build the necessary infrastructure for synchronizing the BO attributes and GUI components. This infrastructure includes implementations 132.2 of the editor interfaces 142 that are configured to interact with respective GUI components. Among other things, the editor interfaces 142 provide methods for reporting changes in or updating the value of a GUI component. Preferably, each editor interface 142 is adapted to a particular type of GUI component; e.g., the editor interfaces 142 include interfaces that are specialized to work with a text field, check box, text vector and list GUI components. The infrastructure also includes an implementation 132.4 of the selection interface 146 that includes one or more BOs whose attributes are to be synchronized with the GUI. The selection interface 146 includes methods that can be used by an application 124 to defined the selected BOs and also includes methods that report changes in the values of the selected BO's properties. The editors 132.2 and selection instance 132.4 report changes to an inspector implementation 132.1 that coordinates their actions. The inspector implementation 132.1 accordingly invokes appropriate editor or selection methods to synchronize BO/GUI values or change an indication of the selected BO.

In one embodiment the selection interface 144 includes a method that sets up property change listeners to report on changes in the values of attributes of any combination of the selected BOs. Similarly, each editor interface 142 includes a method that registers appropriate listeners to an associated GUI component. These methods are not invoked by an application 124, but by respective implementations 132.2, 132.4 of the editor and selection interfaces 142, 146 as necessary.

The editor filter interface 144 provides methods that perform a filtering function on values reported by or used to update a respective editor. This filtering function can include any combination of transforming, decoding, or filtering values between a BO representation and a GUI representation. The methods of the editor filter interface 144 are called by the editors 132.2 as necessary.

The data 150 includes elements of the aforementioned linker infrastructure. These elements include the inspector interfaces 140–144, which have been described, and the supporter classes 156. The supporter classes 156 encapsulate the methods and data structures needed to setup listeners and values in different types of GUI objects (e.g., Java Text Fields, Java Lists, Java Labels, etc.). These tasks can be performed using conventional GUI programming techniques. However, supporters 156 are advantageous as they allow new types of GUI components to be added to an application (e.g., the inspector framework 132) without requiring the application to be recoded. These aspects of supporters are described in detail in a co-pending patent application (SUPPORTERS PROVIDING EXTENSIBLE CLASSES WITHOUT RECODING FOR OBJECT-ORIENTED APPLICATIONS) by Alejandro Abdelnur, which is entirely incorporated herein by reference. Additional details of the supporter classes 156 and the FIInspector, FIEditor and FISelection interfaces 140, 142, 146 are shown in FIG. 1B.

Referring to FIG. 1B, there is shown a block diagram of the supporters 156. The supporters 156 include GUI component supporters 170. The GUI component supporters 170 include supporters for whatever types of GUI components need to be accessed by the application objects 124. For example, a set of supporters 170 for a Java™ application whose GUI includes combo boxes, labels, lists, text fields, text components, toggle buttons, button groups and tables implemented as Java™ Swing components (JComboBox, JLabel, JList, JTextField, JTextComponent, JToggleButton, JButtonGroup and JTable, respectively) would include: JComboBox supporter 172, JLabel supporter 174, JList supporter 176, JTextField supporter 178, JTextComponent supporter 180, JToggleButton supporter 182, JButtonGroup supporter 184 and JTable supporter 186. For more background information on the Swing component set, refer to Mark Andrews, "Introducing Swing," available at http://www.javasoft.com/jfc/swingdoc-static/what_is_swing.html; and Amy Fowler, "An Overview of Swing Architecture," available at http://www.javasoft.com/jfc/swingdoc-static/swing_arch.html, each of which is entirely incorporated herein by reference.

FIG. 1B also shows the methods that compose the FIInspector 140, FIEditor interfaces 142 and FISelection interface 146. The illustrated methods do not include the constructor method that is included in all classes and which is used to return an instance of its associated class. A constructor method has the same name as its associated class and is invoked with the "new" prefix. For example, an application 124 needing a new instance of the FIInspector class would issue the following message: "new FInspector( )".

The methods of the FIInspector interface 140 include:

setSelection 140.1, addPropertySupport 140.3, addEditor 140.4, queuePropertyChange 140.5, firePropertyQueue 140.6.

The methods of the FIEditor interfaces 142 include:

addNotificationListener 142.1, getProperty 142.2, setEnabled 142.3, setMultiValued 142.4, setValue 142.5.

The methods of the FISelection interface 146 include:

setElements 146.1, new FISelection 146.2, setPropertiestoValues 146.3, setPropertytoValue 146.6.

These classes can invoke public methods of other classes. For example, FISelection interface methods make use of public CompoundEdit and new StateEdit methods, which are constructors, respectively, for CompoundEdit and StateEdit objects used by FISelection instances to keep track of edit operations.

These methods and other methods of the FIInspector, FIEditor and FISelection interfaces 140, 142, 146 are described below, in reference to FIGS. 6–8. Java™ programming language versions of these interfaces are shown in the Appendices A, B and D, respectively. Note that the editors 132.2 employed in the present invention are implementors of the basic FIEditor interface; therefore, these editors implement all of the FIEditor interface's methods. The editors 132.2 are, however, specialized to interact with particular types of GUI components. For illustration purposes, Appendix C shows a Java™ programming language version of the methods of a FIEforTextField interface, which defines the editor methods for use with TextField components.

Figure 2:
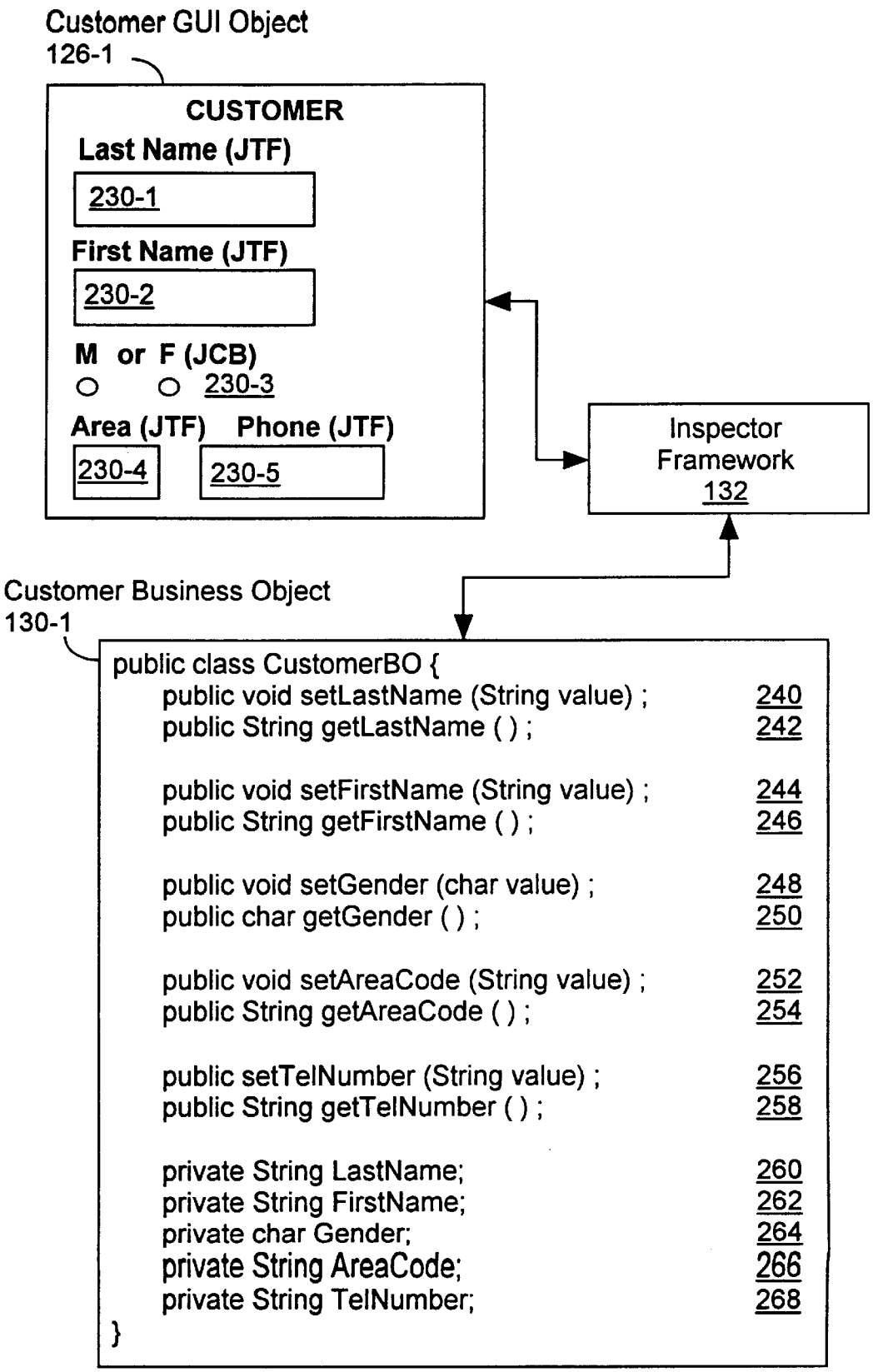
FIG. 2 is a block diagram showing how an embodiment of the inspector framework links a hypothetical customer GUI and a corresponding customer BO.

Referring to FIG. 2, there is shown a block diagram illustrating a hypothetical Customer GUI object 126-1 and a corresponding Customer Business Object 130-1 linked together by the inspector framework 132. The Customer GUI object 126-1 is a representation of a visual 116 on which a customer information GUI is displayed. There are many, well-known ways to represent GUI components. For example, in the Java™ programming language, each GUI component (or widget) is internally represented as an instance of a particular class (e.g., a textField or checkBox class) that defines the widget's visual behavior and characteristic values. The present invention is not limited to any particular GUI representation. Therefore, for the purposes of the present application, the GUI objects 126 are shown only generically.

The Customer GUI 126-1 includes a last name text field 230-1, a first name field 230-2, male (M) and female (F) check boxes 230-3, an area code text field 230-4 and a phone text field 230-5. In the illustrated embodiment, which is implemented in the Java™ programming language, the fields 230-1, 230-2, 230-4 and 230-4 are instances of a Java textField (abbreviated JTF) and the checkboxes 230-3 are instances of a Java checkBox (JCB).

The corresponding Customer Business Object 130-1 includes attributes mapped to the GUI components 230. The mapping can be 1 to 1, where each component 230 is mapped to a corresponding BO attribute, 1 to many or many to 1. The situation shown in FIG. 2 presumes a 1 to 1 mapping. Therefore, the Customer BO 130-1 includes Last-Name 260, FirstName 262, Gender 264, AreaCode 266 and TelNumber 268 attributes that correspond, respectively, to the last name field 230-1, first name field 230-2, male (M) and female (F) check boxes 230-3, area code field 230-4 and phone field 230-5 of the Customer GUI 126-1. In this example the LastName, FirstName, AreaCode and TelNumber attributes are strings and the Gender attribute is a character (char).

In the illustrated embodiment, each BO 130 is implemented as a JavaBeans™ object. Among other things, for each of its attributes a JavaBeans™ object has a pair of get and set routines used, respectively, to read and write the value of that attribute. All JavaBeans™ objects share a naming convention whereby the get and set routines associated with a particular attribute with identifier "Attr" are respectively named "getAttr" and "setAttr". By ensuring that BOs 130 are implemented as JavaBeans™ objects, given that the inspector framework 132 knows the identifiers of all of a BO's attributes, the inspector framework 132 is able to generate set and get calls as needed to synchronize those attributes with the corresponding GUI components. For example, if the inspector framework 132 is notified of a change to the last name field 230-1, it updates the value of the LastName attribute using the setLastName method 240. Similarly, when notified of a change to the LastName attribute 260 the inspector framework 132 (or a listener) can retrieve the new value using the getLastName method 242. For more information on JavaBeans™, refer to "How to Program JavaBeans," Ziff-Davis Press, ISBN 1-56276-521-3 or Patrick Niemeyer & Joshua Peck, "Exploring Java," (2nd ed. 1997), each of which is entirely incorporated herein by reference.

The inspector framework 132 has two phases of operation. In an initialization phase, in response to commands from an application 124 the inspector framework 132 scans a business object 130, identifies its attributes, maps the BO attributes to the GUI components and registers appropriate listeners 136 to the corresponding GUI object 126 and BO 130. In a synchronization phase the inspector framework 132 synchronizes the GUI object 126 and the corresponding business object 130 based on events reported by the listeners 136 and the mapping information. Additional details of the inspector framework 132 are shown in FIG. 3.

Figure 3:
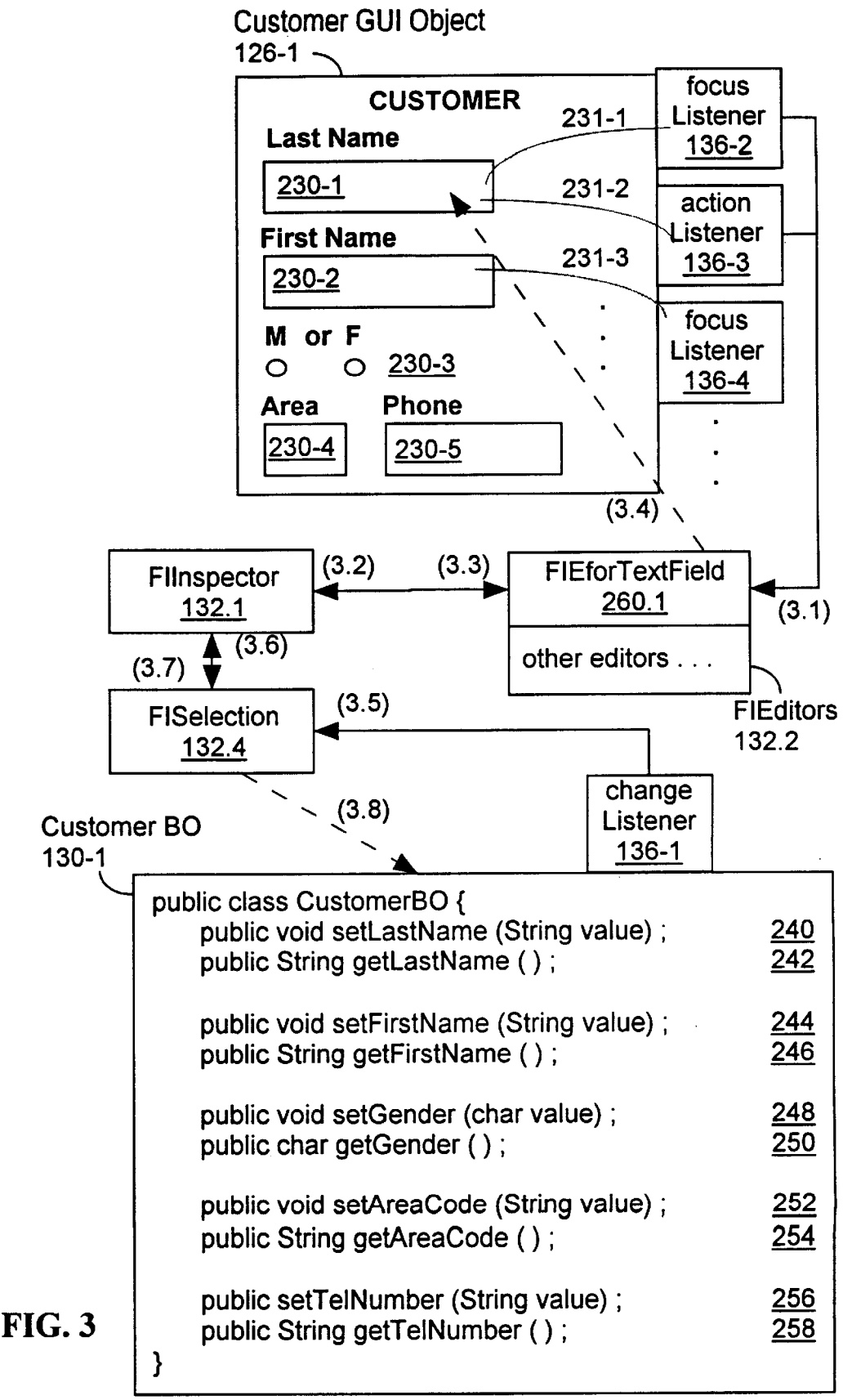
FIG. 3 is a block diagram showing additional details of an embodiment of the inspector framework.

Referring to FIG. 3, there is shown a block diagram illustrating additional details of the inspector framework 132 and the way in which the framework's components interact with the customer GUI object 126-1 and the corresponding customer BO 130-1 from FIG. 2. As already described, the inspector framework 132 includes an inspector implementation 132.1, a plurality of editors 132.2 and a selection implementation 132.4. Each editor 132.2 interacts with a respective GUI component 230 directly (when there is a need to update the GUI component) or indirectly, via an appropriate set of listeners 136 (when the editor is being notified of changes to the GUI component 130). The editors 132.2 are implementations of whichever editor interface 142 matches the type of the editor's associated GUI component.

For example, the Last Name GUI component 230-1 is coupled to an editor 260.1 that is an implementation of "FIEforTextField", which is an editor interface customized for text fields. The FIEforTextField editor 260.1 is notified of events involving the Last Name text field 230.1 via the action and focus listeners 136-2, 136-3 (3.1). The FIEforTextField editor 260.1 then notifies the inspector implementation 132.1 of events reported by its associated listeners 136-2, 136-3 (3.2). The FIEforTextField editor 260.1 updates its associated GUI component 230-1 directly (3.4) based on information provided by the inspector interface (3.3).

The selection implementation 132.4 interacts with a BO 130 directly (when it needs to update one or more BO attribute) or indirectly (when the selection 132.4 is being notified of changes to one or more BO attribute), sometimes via a property change listener 136.1. One selection implementation 132.4 manages interactions between the inspector 132.1 and all of the selected BOs 130.

For example, FIG. 3 shows an implementation 132.4 of the FISelection interface that manages interactions between the inspector 132.1 and a representative Customer BO 130-1. Note that if there were two selected Customer BOs 130-1 (e.g., one per customer object returned by a database application 124), then the selection implementation 132.4 would manage inspector interactions for both BOs 130-1. The FISelection implementation 132.4 is notified by the property change listener 136-1 whenever any of the Customer BO 130-1 attributes are changed (3.5). The FISelection implementation 132.4 then notifies the inspector implementation 132.1 of events reported by its associated listener 136-1 (3.6). The FISelection implementation 132.4 updates its associated GUI component 230-1 directly (3.8) based on information provided by the inspector interface (3.7). The interrelationships between the inspector framework interfaces 140, 142, 146 and their implementations 132.1, 132.2, 132.4 are more thoroughly described in reference to FIGS. 4 and 5.

Figure 4:
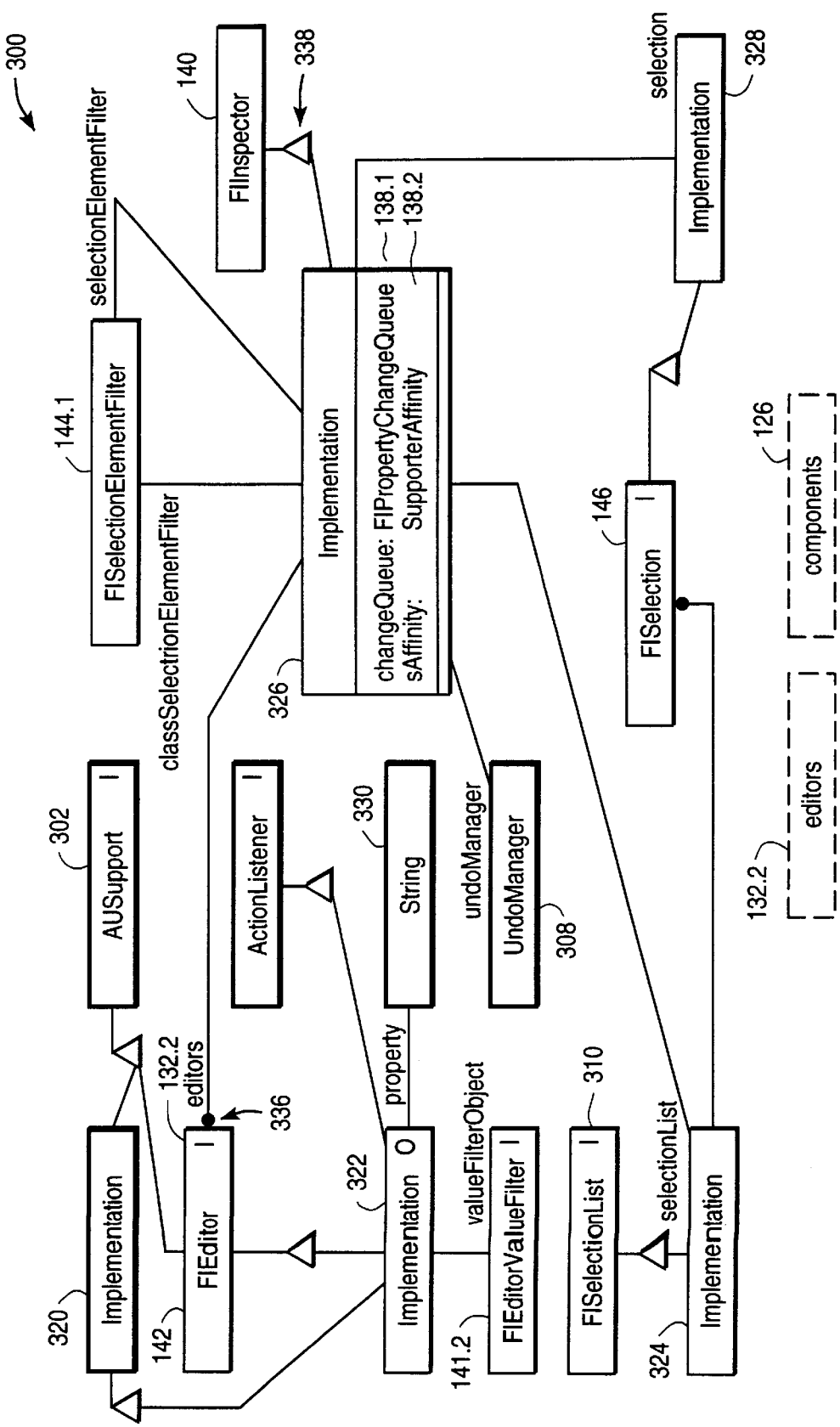
FIG. 4 is an object model of an embodiment of the inspector framework.

Referring to FIG. 4, there is shown an object model 300 of one embodiment of the inspector framework. This model uses a symbolic notation that is well-known in object-oriented design. In this notation a first box connected to another box with a connector terminated with a filled-in circle (e.g., 336) touching the first box indicates a many to one relationship between the objects represented by the first box and the other box. Additionally, a first box connected to another box with a connector on which an open triangle with a point directed to the first box (e.g., 338) is superimposed indicates that the other box is an implantation of or otherwise inherits methods/data structures from the first box. The model 300 represents the relationships between the FIInspector, FIEditor, Filters and FISelection interfaces 140, 142, 144, 146; ancillary classes, such as Supporters 156, ActionListener 304, UndoManager 306, and FISelectionList 310; and implementations 320, 322, 324, 326, 328 of selected interfaces. The object model 300 is mostly self-explanatory. However, for clarity, it is now briefly described.

The central interface is FIInspector 140, which receives inputs from and manages: a FISelectionElementFilter 144.1; an implementation 328 of the FISelection interface 146; an implementation of 324 the FISelectionList interface 310 and one or more editors 132.2, each of which is an extension of a top level FIEditor interface 142. The inspector implementation 326 (corresponding to the inspector 132.1 of FIG. 1A) includes a changeQueue 138.1, which is an instance of a FIPropertyChangeQueue class. The changeQueue 138.1 is where the inspector 326 records all changes that need to be effected on their respective GUI components and BO attributes by the editors 132.2 and selection implementation 328. The inspector 326 adds entries to the changeQueue 138.1 based on events reported by the editors 132.2 and the selection 328. The changeQueue 138.1 is implemented as a dictionary, each entry of which has a key and a value. In one embodiment the key is the name of the property to be updated and the value is the new value of that property. Alternative implementations of the changeQueue 138.1 are possible as long as the required property and new value information is conveyed. The inspector 326 fires the changes set out in the changeQueue 138.1 either immediately (as soon as they are entered) or delayed (at some later time designated by an application 124). The "delayed" mode is useful for situations where a user might wish to modify a set of program options and then implement the entire set of changes simultaneously (e.g., by hitting an OK button) or not at all (e.g., by hitting a CANCEL button).

The inspector 326 also includes a supporterAffinity 138.1, which is an instance of an SupporterAffinity class 158. The SupporterAffinity class 158, which is described in depth in the co-pending patent application (SUPPORTERS PROVIDING EXTENSIBLE CLASSES WITHOUT RECODING FOR OBJECT-ORIENTED APPLICATIONS), provides methods for managing a group of supporters 156 (e.g., AUSupport 302) employed by an application and encapsulates the group of supporters it manages.

As already described, each implementation 322 of the FIEditor class 142 is associated with a particular GUI component that GUI component's listeners. In FIG. 4 the implementation 322 is associated with a component 330 whose value is stored as a string and an action listener 304 that reports changes in the value of that component 330 to the editor. The editor implementation 322 is also associated with a FIEditorValueFilter 144.2, which transforms values to and from the string format required by the component 330, and an implemention 320 of a supporter (AUSupport) 302 for that component type 330. The supporter 302 also provides methods used by the FIEditor interface 142. As already mentioned, all editors 132.2 reports change events to the FIInspector implementation 326, which adds updates necessitated by the changes to the changeQueue 138.1.

The FISelection implementation 328 is the interface between the FIInspector implementation 326 and the selected Business objects 130. One or more FISelection objects, each including a collection of selected business objects 130, can be returned by an implemention 324 of the FISelectionList interface 310. The implementation 324 provides the FIInspector implementation 326 with all of the BOs that need to be inspected following a change in any BO attribute value or changes to the selection of BOs. When it needs to update particular BO attributes, the FIInspector implemention 326 invokes appropriate methods of the FISelection implementation 328. The FIInspector implementation 326 has access to a FISelectionElementFilter 144.1, which provides methods to translate values into whatever format is required by any BO attributes to be updated.

Figure 5:
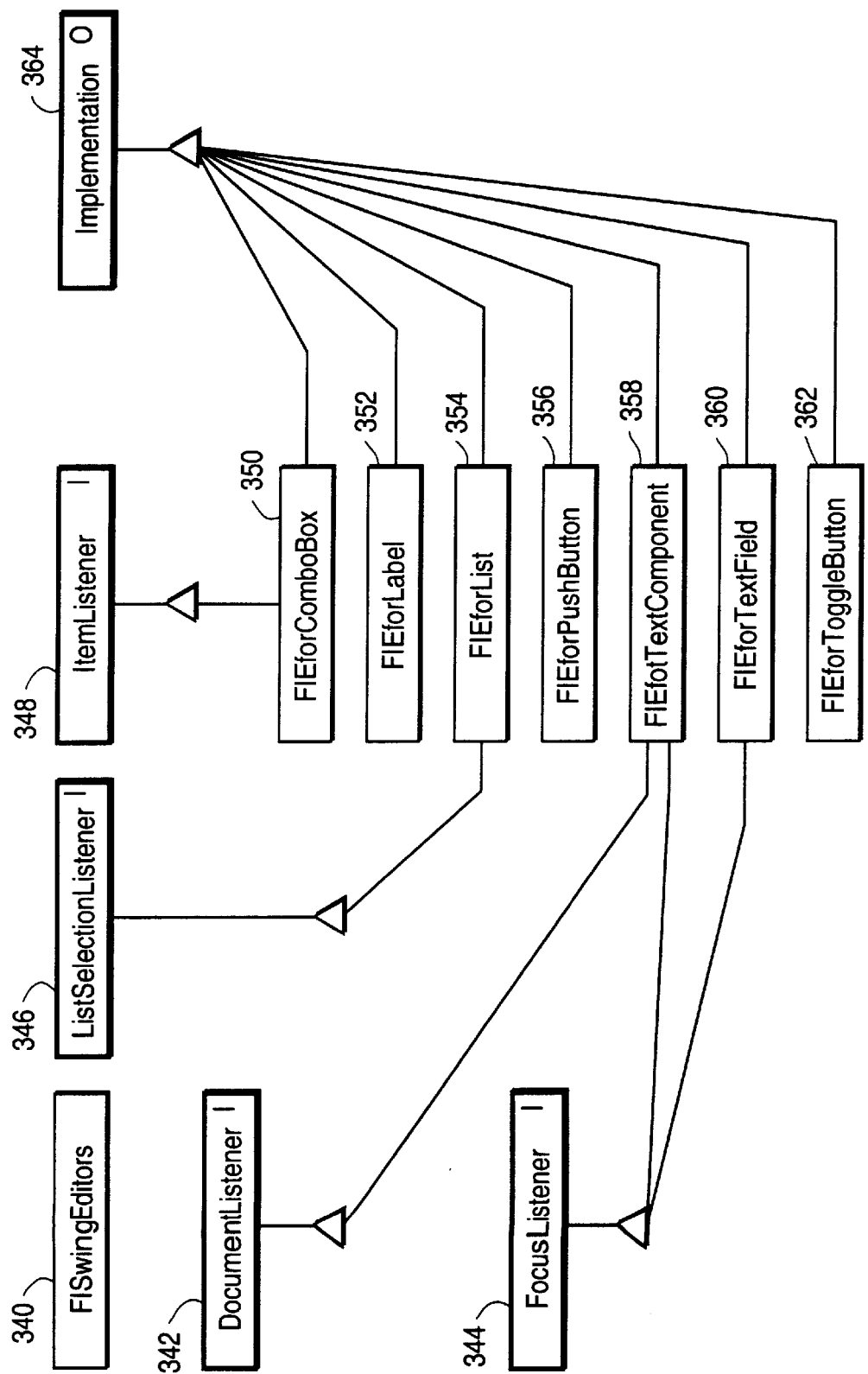
FIG. 5 is an object model of some of the GUI editor types that can be employed in the embodiment of FIG. 3.

Referring to FIG. 5, there is shown is an object model of GUI editor types that can be employed in the embodiment of FIG. 3. The editors 132.2 for use in an embodiment wherein the components are Java™ Swing components are called Swing editors 340. These editors 132.2 and the types of Swing components they are configured to work with include:

| Editor Type | | Swing Component |
|---|---|---|
| FIEforComboBox | 350 | combo box |
| FIEforLabel | 352 | label |
| FIEforList | 354 | list |
| FIEforPushButton | 356 | push button |
| FIEforTextComponent | 358 | text component |
| FIEforTextField | 360 | text field |
| FIEforToggleButton | 362 | toggle button |

Each editor is configured to work with the listener type(s) 136 that is used by its respective component type. For example, the FIEforTextComponent and FIEforTextField work with listeners that are instances of the FocusListener type 344. This is necessary as a focus listener when a user moves a cursor or other selection indicator inside the boundaries of a text object. Other associations between editors 132.2 and listeners 136 include:

| Listener Class | | Used by |
|---|---|---|
| ListSelectionListener | 346 | FIEforList editor 354 |
| ItemListener | 348 | FIEforComboBox 350 |
| DocumentListener | 342 | FIEforTextComponent 342 |

The various listeners 136 are conventional and are not described herein. The two phases of operation (initialization and synchronization) are now described in reference to FIGS. 6–8.

Figure 6:
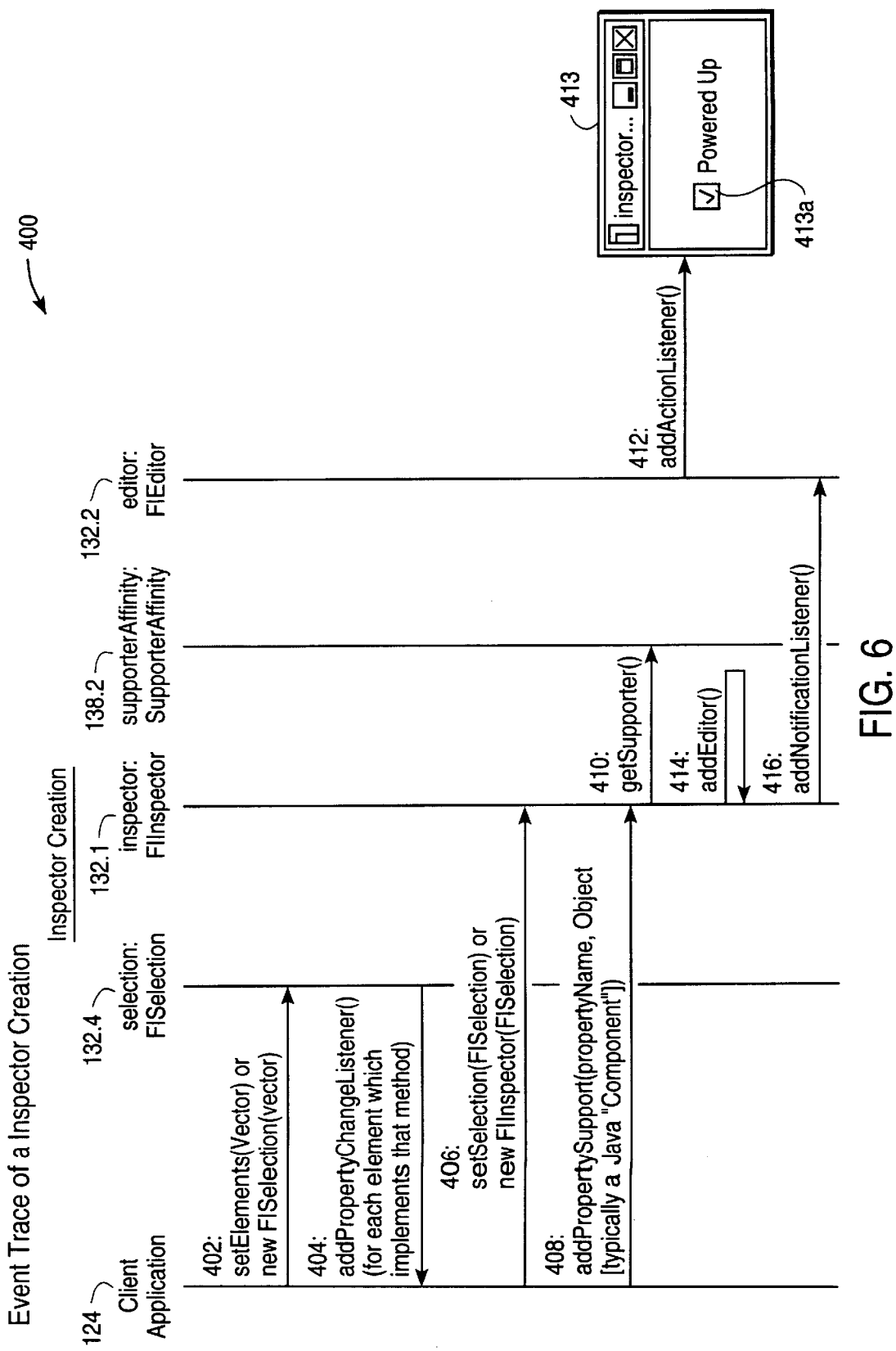
FIG. 6 is an object transition diagram illustrating the order of events accompanying the creation of a new inspector instance and an infrastructure for synchronizing a selected BO with a set of GUI components.

Referring to FIG. 6, there is shown an object transition diagram 400 illustrating the order of events accompanying the creation of a new inspector instance and an infrastructure for synchronizing a selection of BOs with a set of GUI components. Object transition diagrams are well-known in the art. Briefly, each of these figures sets out the objects (and their associated classes/interfaces) that are involved in a particular operation along the top of the chart and indicates from top to bottom the order in which the various class methods are invoked as the operation proceeds. Each method invocation is indicated with a label on an arrow directed to the class whose method is being invoked. For example, the first step 402 in FIG. 6 is the invocation of the setElements method of the selection object 132.4, which is an instance/implementation of the FISelection interface 146. In the following descriptions, each step label is enclosed in parentheses.

Figure 8A:
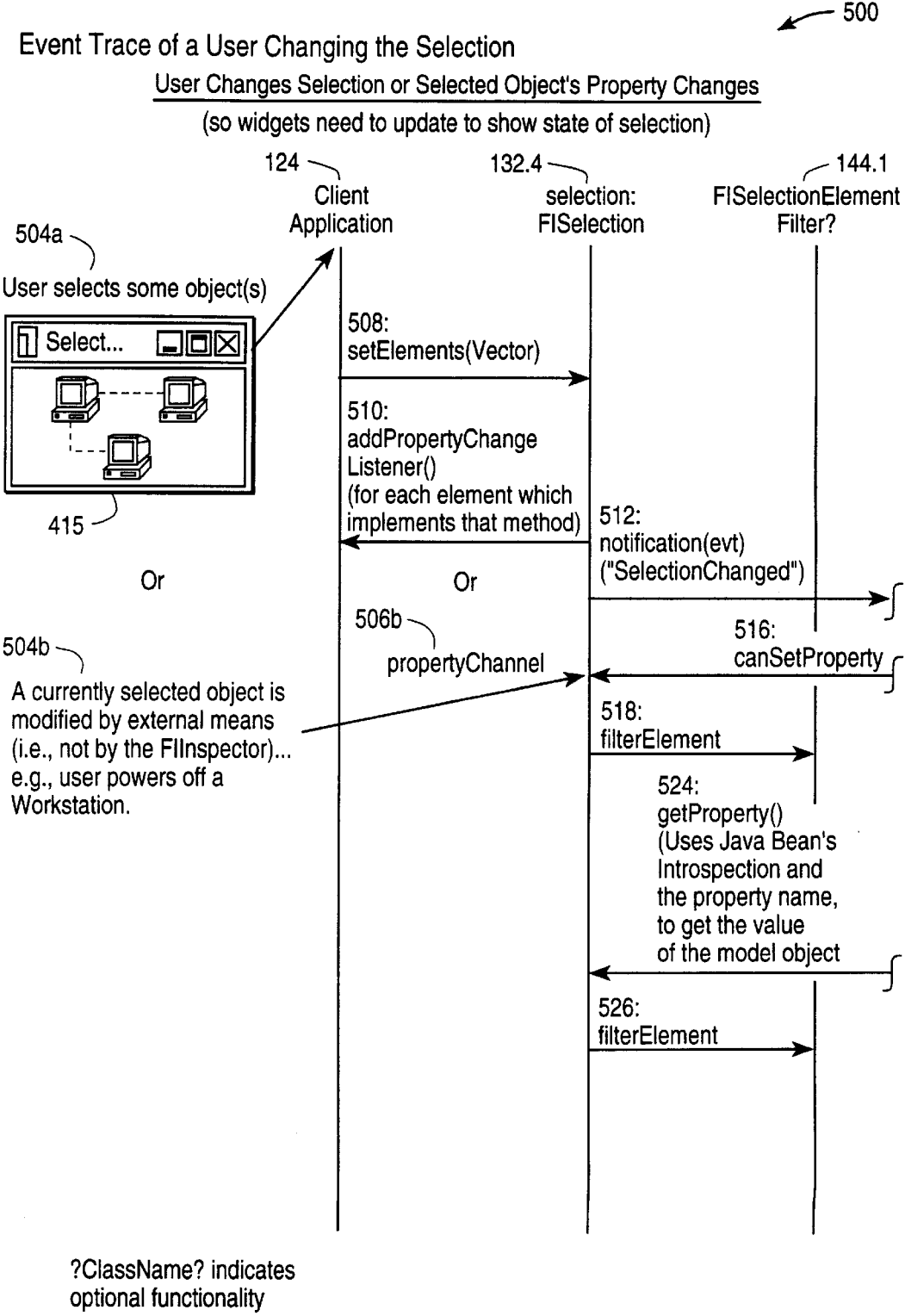
FIG. 8 is an object transition diagram illustrating the order of events through which the inspector framework updates a GUI component value in response to a change in a selected BO or a change in value of a BO property.
Figure 8B:
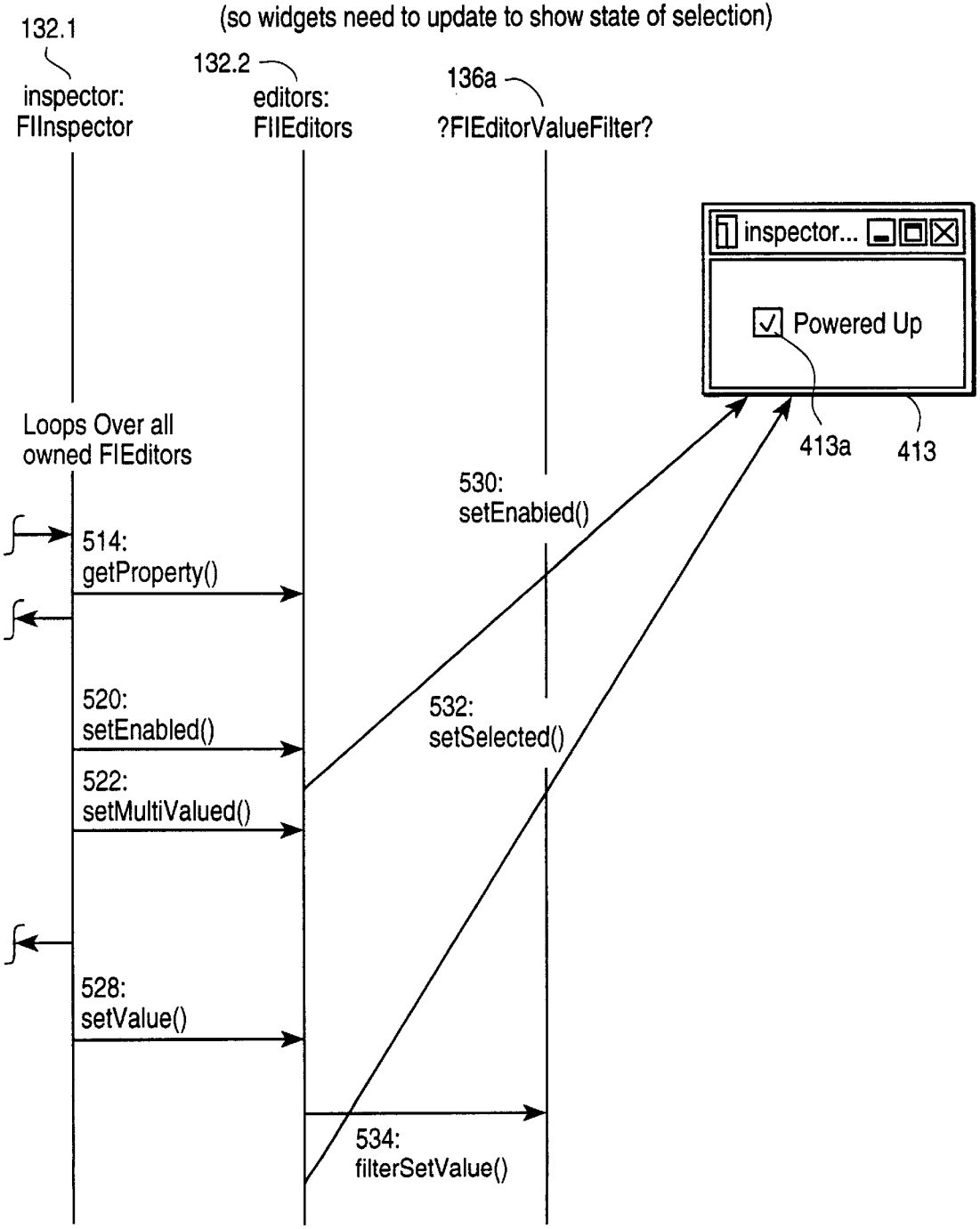

FIG. 6 and FIGS. 7, 8 are directed to an example where an application defines a link between an inspector GUI panel 413 that indicates/determines with a single CheckBox component ("Powered Up") 413a whether one or more workstations is powered up, and a selection of BOs representing the status information of a respective workstation. FIG. 6 shows how a client application 124 initializes the inspector framework 132. FIG. 7 shows how the inspector framework 132 updates the BOs of the selection based on a change made by a user on the inspector pane 413. FIG. 8 shows how the inspector framework 132 updates the inspector pane 413 based on a change of selection 415 or a change to a BO attribute value made by a user.

Referring again to FIG. 6, an application 124 initializing the inspector framework 132 first invokes (402) the "setElements(Vector)" or "new FISelection(Vector)" methods of the FISelection class 146, where "Vector" is a vector of BOs composing the application's selection 132.4. Typically, these BOs have similar attributes; e.g., a selection of BOs representing status of similar work stations or a collection of customer records from a database application. The "setElements" method is invoked when the application 124 needs to change the vector of an existing selection 132.4 and the "new FISelection" method is invoked when the application 124 needs to construct a new selection 132.4. The updated/new selection 132.4 then calls (404) the "addPropertyChangeListener" method of each BO 130 that implements this method. In response, the BOs that implement the "addPropertyChangeListener" method construct a respective property change listener that reports changes to that BO's attributes to the selection 132.4. If a BO 130 does not implement this method the selection must have alternate methods to determine when the BO attributes have been changed.

The client application 124 then invokes (406) the setSelection(FISelection) or new FIInspector(FISelection) methods of the FIInspector class 140, where "FISelection" is the selection 132.4 created or updated in the previous step (402). The setSelection method is invoked when the application 124 needs to change the selection 132.4 of an existing FIInspector implementation 132.1 and the new FIInspector method is invoked when the application 124 needs to construct a new FIInspector implementation (hereinafter, the inspector) 132.1. The application 124 then invokes (408) the addPropertySupport(propertyName, Object) method of the FIInspector implementation 132.1 for each attribute of the BOs in the selection 132.4. In this method, "propertyName" is the name of a BO attribute and "Object" is the GUI component to which it is to be mapped.

The addPropertySupport method of the FIInspector 132.1 calls (410) the getSupporter( ) method of its SupporterAffinity 158, which returns a supporter of the appropriate type for managing interactions with the "Object". The co-pending application incorporated herein (SUPPORTERS PROVIDING EXTENSIBLE CLASSES WITHOUT RECODING FOR OBJECT-ORIENTED APPLICATIONS) describes in detail operations of the SupporterAffinity 158. The addPropertySupport method then calls (414) the addEditor method of the FIInspector 132.1, which allocates an editor 132.2 that is adapted to interact with the type of the "Object". The addPropertySupport method employs the Supporter returned by the getSupporter( ) method (410) to return a created instance on an FISelection subclass. The FIInspector implementation 132.1 then invokes the addNotificationListener( ) method of the newly added editor 132.2, which adds to the editor 132.2 a notification listener that will notify the inspector 132.1 of changes to the editor's associated component. This method actually involves the inspector 132.1 adding itself as a listener of notifications from the editor 132.2 (416).

As part of its initialization the editor 132.2 also invokes (412) the addActionListener( ) or other similar method of its associated component. This method actually involves the editor adding itself as an action listener to the GUI component with which it is associated during the initial construction of the editor instance. FIG. 6 shows the use of an action listener because that is the type of listener associated with a check box GUI component on the inspector GUI panel 413. Once the steps of FIG. 6 have been completed, the infrastructure for synchronizing the BO attributes and GUI components is in place. Two different synchronization operations are now described in reference to FIGS. 7 and 8.

Referring to FIG. 7, there is shown an object transition diagram 450 illustrating the order of events through which the inspector framework 132 updates a selected BO in response to a change in an associated GUI component. In this example a user has just changed (452) a value of a component 413a (e.g., the "Powered Up" check box) in the inspector GUI panel 413. In response to the user-initiated change, the actionListener 136 registered to the updated component 126 returns (454) an "actionPerformed( )" message to the FIEditor implementation 132.1; this message indicates to the FIEditor implementation 132.2 that an action was performed on the editor's associated GUI component 126. The FIEditor implementation 132.2 then returns (456) to the FIInspector implementation 132.1 a "notification (evt)" message, where "evt" is a string that indicates the type of change to the component (e.g., "evt"="Editor Changed" indicates that the change was an event issued by a GUI component listener notified by an editor). Generally, notifications can originate from an editor instance 132.2; for example, when an editor 132.2 receives an action listener notification, it fires its own notification, which the inspector 132.1 receives. Notifications can also originate from a selection 132.4; for example, when the vector of BOs in the selection 132.4 changes, the selection 132.4 fires a notification which the inspector 132.1 receives. In response to the notification (456) the FIInspector implementation invokes (458) the getProperty method of the FIEditor implementation 132.2. This method returns a string to the FIInspector implementation 132.1 that indicates the attribute(s) to which the changed component is bound. If the optional EditorValueFilter 144.2 is implemented, the FIEditor implementation 132.2 invokes the filterGetValue method of the associated EditorValueFilter implementation; this method returns the new component value, transformed in an appropriate manner from the GUI component representation to the representation used by the corresponding BO attribute(s). The FIInspector implementation 132.1 then adds a property change entry to the changeQueue using its queuePropertyChange method (462). This property change entry indicates the property/attribute to be changed as well as the new value of the property/attribute. The FIInspector implementation 132.1 obtains the new value from the FIEditor implementation 132.2 by invoking (464) that object's getBoundObjectValue method.

Upon completing the property change entry, the FIInspector implementation 132.1 executes (466) its "firePropertyQueue( )" method, which attempts to execute all uncompleted property change entries included therein. For each of the uncompleted property change entries the FIInspector implementation 132.1 invokes the "setPropertiesToValues( )" method of the FISelection implementation 132.4, which invokes the private "new CompoundEdit( )" method. This method 132.4 creates a new instance of a CompoundEdit class that manages the edits that are to be performed on the selected BOs. If the optional UndoManager capability 308 is implemented, the FISelection implementation 132.4 then invokes (472) the "addEdit( )" method of the UndoManager 308. This method adds the current state of the BO to the UndoManager so that the change can be undone if necessary.

The CompoundEdit class provides a wrapper for many single edit instances. For example, in an application with a palette in which there are several selected shapes, dragging those selected shapes to another location conceptually requires each graphic to undergo its own move. Therefore, assuming there are N graphical objects being moved, then N edits are required—one for each graphical object that moves. From a user perspective it is desirable that each of the N moved objects be moved back to its initial position following a single Undo operation. However, if the N edits were not bundled in some way, following an Undo only one of the N edits would be undone. The CompoundEdit objects can wrap all of the N edits so that, after passing the CompoundEdit object to the UndoManager 308, a single Undo operation will Undo all of the edits contained in the CompoundEdit object.

The FISelection implementation 132.4 then begins a loop on all of the selected BOs (elements) to determine which the attributes of the selected elements can be updated in light of the pending change. This loop involves the FISelection implementation 132.4 performing the following steps for each of the selected elements:

(1) Creating (474) a new instance of a StateEdit class by invoking the private "new StateEdit( )" method. A StateEdit instance records the state of all of the variables in a class before and after an event. In the above example of dragging a graphical object, the application 124 would create a StateEdit instance, record the location and other variables associated with a graphical object, perform the move, and then take a snapshot of the location and other variables of that graphic. One instance of the StateEdit class is the edit for the move of one graphical object.

(2) Invoking (476) the private "setPropertytoValue( )" method, which sets to the new value the property of the currently selected BO that is most similar to the property provided by the FIEditor implementation in response to the "getProperty( )" message (458) (Note; setting the values of BO attributes involves invoking the "set" method associated with the property name of each BO attribute to be updated—this process relies on the introspection capabilities of JavaBeans™ objects).

(3) Closing (480) the StateEdit instance once all like properties have been updated with the new value.

Once the loop on all of the selected BOs has completed, the FISelection implementation 132.4 calls the end( ) method of the newly created CompoundEdit.

Referring to FIG. 8, there is shown an object transition diagram illustrating the order of events through which the inspector framework updates a GUI component value in response to a change in a selected BO or a change in value of a BO property. The need to update a GUI component that is bound to attributes of one or more BO can be triggered by two types of event. In one case, a user selects from an application window 415 one or more objects to be added to a selection 132.4 (504a). The client application 124 with which the application window 415 is associated responds to this event by invoking the "setElements(Vector)" method of the current selection 132.4. The "Vector" in this case includes the set of objects just selected by the user on the window 415. The selection 132.4 then calls (510) the "addPropertyChangeListener" method of each BO 130 that implements this method. In response, those BOs construct a respective property change listener that reports to the selection 132.4 changes in that BO's attributes.

In a second case, a currently selected object is modified by external means, by which it is meant that the change is not caused by the inspector 132.1. An example of such a change is when a user powers off a workstation represented by one of the selected business objects 130 (504b). When this occurs the property change listener 126 associated with that business object 130 sends a "propertyChanged( )" message to the selection 132.4 (506b). This message includes the name of the changed attribute and that attribute's old and new values. E.g., in the illustrated example the changed attribute might be "powerStatus" and the old and new values ON and OFF, respectively. The selection 132.4 issues a "notification(evt)" message to the inspector 132.1, where "evt" is a string set to "Selection Changed", which indicates to the inspector 132.1 that the selection 132.4 has changed and needs to be inspected.

The remaining steps are common to both cases. In these remaining steps the inspector 132.1 updates the GUI components. The inspector 132.1 performs these operations in a loop over all of its associated editors 132.2.

As a first step in the loop the inspector 132.1 invokes each editor's "getProperty( )" method (514). The "getProperty" method returns the name of the property/BO attribute that the GUI component managed by that editor 132.2 is bound to. For example, an editor 132.2 associated with the "Powered Up" check box in the inspector GUI panel 413 might return the string "powerStatus". The inspector 132.1 then calls the "canSetProperty(arg)" method of the selection 132.4., where arg is a string set to the property returned by the editor's getProperty( ) method. The "canSetProperty (arg)" method returns a boolean indicating whether or not the selection 132.4 can set the attribute whose name is provided in "arg". This method accomplishes this by traversing the vector of selected BOs and determining whether any BO can set the specified property. The "canSetProperty" method does this by looking for a JavaBeans™ method name for the specified property. "Arg" can also include a "selectionElementFilter", which is an instance of the FISelectionElementFilter 144.1. All methods that take a "selectionElementFilter" argument will give the selection filter an opportunity to filter each element/business object in the selection 132.4 (518). Filters examine each element of the selection 132.4 and return:

1) The same element if it is to be inspected.

2) Some other object (e.g., a proxy) or sub-object that should be used for inspection purposes. This option allows more complex value setting/getting than simple calls to the methods of a JavaBeans™ object. For example, if an inspector 132.1 needs to do something complex to get/set the value of a field, it can return itself as the selected business object.

3) "Null" if this object should not be inspected.

Based on the return value the inspector 132.1 invokes the "getProperty( )" method of the selection 132.1 with an argument that indicates, among other things, the name of the property to be set (524). The argument can also include a selectionElementFilter, which performs the same actions described above (526). The "getProperty" method uses the introspection capabilities of JavaBeans™ and the property name to "get" the value of the specified property. Also based on the routine value of the canSetProperty( ) method, the inspector 134-1 invokes the setEnabled( ) method of each of the editors 132.2 with a boolean argument that indicates whether the editor is enabled to set the value of their corresponding GUI component in response to a subsequent setValue message (520). The inspector 134-1 also invokes the "setMultiValued( )" method of each of the editors associated with the GUI components with a boolean argument that indicates whether there are multiple values for the property name in the selection (522). This is necessary in situations where one or more selected BOs indicated to the inspector 132.1 that they have different values for that property. This would be expected in situations where the selected BOs have similar attributes. For example, consider the situation where a client appliction 124 performs a database search for customers with the last name, "Smith". This search might return multiple Customer BOs, corresponding to the different customers (with different first names) whose last name is "Smith". It would be the responsibility of the editor 132.2 that manages the First Name GUI component of a database query viewer GUI to indicate in some manner all of the different first names of the selected customer BOs.

In response to the setEnabled message 520, the editor 132.2 issues a setEnabled message to its associated component (530). This message has a boolean argument that indicates whether the corresponding field is off (i.e., unavailable for input or display) or on. The editor 132.2 issues this message when the properties in the selection are not related to the property to which the component is bound. For example, if a editor's GUI component reflects income and the collection of BOs has nothing to do with income, the editor 132.2 would set the component to off.

Once it has received the "get" value from each of the BOs able to set the specified property, the inspector 132.1 updates the values of components bound to the specified property via each components editor 132.2. If there are multiple values for the editor's component, the inspector 132.1 has two options. First, the inspector 132.1 can invoke a special method of the editor 132.2 that is able to handle the display of multiple values. These special methods can be implemented in any manner. Alternatively, the inspector can force all values of a heterogenous set of properties to the same value by calling the editor's setValue( ) method. The setValue method either sets the value of the bound component directly or, if an editorValueFilter class instance is set, the editor 132.2 sets the value of the component to the filtered value returned by that editorValueFilter instance.

The "setValue( )" method performs the following actions:

1) Sets the editor's "ismultiValued" attribute to "false" since, if the value is set to a single value, then the editor cannot be "multiValued".

2) Filters the value if an optional "valueFilter" object has been set (534) (a "valueFilter" object is set by the client application 124 using the setValueFilter method of the FIEditor class; the argument passed by the application 124 to the setValueFitler method is a filter object that implements the FIEditorValueFilter interface).

3) Calls this interface's "setBoundObjectValue( )" method to set the bound GUI component's value. If a "valueFilter" had been set, then the value returned by that filterObject is the object passed to the "setBOundObjectValue( )" method.

If optional instances of the FISelectionElementFilter 144.1 are employed, objects returned by the selection 132.4 are filtered in steps (518) and (526). The instances of the filter 144.1 perform filtering when their filterElement( ) method is invoked by the selection 132.4. The operation of the FISelectionElementFilter 144.1 has already been described above.

As the last step in this operation, in response to the value (filtered or not) conveyed by the setValue message (528), the editor 132.2 sets the state of its "Powered Up" checkbox 413a using the setSelected( ) method of the checkbox component 413a (532). With this method the editor 132.2 causes the checkbox to be selected (checked) or deselected (empty).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A framework for binding data viewers with one to many objects, comprising:

a plurality of classes for associating and synchronizing GUI components and business object (BO) attributes, including:

an inspector class;

a selection class; and a plurality of editor classes; wherein:

the inspector class includes inspector methods and data structures that enable a set of GUI components to be bound to the attributes of a selection of at least one business object (BO);

the editor classes include editor methods and data structures that interact with the GUI components and an inspector class instance, each of the editor classes being configured to work with GUI components of a respective component type; and the selection class includes selection methods and data structures that interact with the selection and the inspector class instance;

such that an instance of the selection class communicates events involving the selection to the inspector class instance, which responsively triggers instances of the editors to update the GUI components accordingly; and the instances of the editor classes communicate events involving the GUI components to the inspector class instance, which responsively triggers the selection class instance to update the selection accordingly.

2. The system of claim 1, wherein the business objects are JavaBeans™ objects, further comprising the selection class instance determining the attributes of the business objects using JavaBeans™ property of introspection.

3. The system of claim 2, wherein the selection class instance writes new values provided by the inspector class instance into the BO attributes using JavaBeans™ Set calls and reads values of the BO attributes using JavaBeans™ Get calls.

4. The system of claim 1, wherein each of the editor class instances is associated with a respective GUI component.

5. The system of claim 1, wherein each of the editor class instances includes knowledge of the BO attributes to which its associated GUI component is mapped.

6. The system of claim 1, further comprising:

a client application that constructs the inspector class instance;

the client application passing the inspector instance a selection class instance that includes the selection of business object(s) whose attributes are to be synchronized with the GUI components; and the client application also passing the inspector class instance a mapping between the BO attributes and the GUI components.

* * * * *